(12) United States Patent
Meyer et al.

(10) Patent No.: US 6,485,245 B2
(45) Date of Patent: Nov. 26, 2002

(54) GRAIN KIT

(75) Inventors: Donald A. Meyer, Dorchester, WI (US); Larry Meyer, Holcombe, WI (US)

(73) Assignee: Meyer Manufacturing Corporation, Dorchester, WI (US)

( * ) Notice: Subject to any disclaimer, the term of this patent is extended or adjusted under 35 U.S.C. 154(b) by 42 days.

(21) Appl. No.: 09/838,516

(22) Filed: Apr. 20, 2001

(65) Prior Publication Data

US 2002/0154981 A1 Oct. 24, 2002

(51) Int. Cl.[7] .................................................. B60P 1/36
(52) U.S. Cl. ........................ 414/528; 239/676; 239/689
(58) Field of Search .......................... 414/528; 239/672, 239/676, 689

(56) References Cited

U.S. PATENT DOCUMENTS

| | | | | |
|---|---|---|---|---|
| 2,967,056 A | * | 1/1961 | D'Amato | ................... 239/676 |
| 4,169,559 A | * | 10/1979 | McKee | ................... 239/672 |
| 4,199,292 A | * | 4/1980 | Kasten | ................... 414/519 |
| 4,475,672 A | | 10/1984 | Whitehead | |
| 5,482,425 A | * | 1/1996 | Podd, Jr. et al. | ............ 414/527 |
| 5,971,494 A | | 10/1999 | Farris | |

FOREIGN PATENT DOCUMENTS

EP   0 404 141   6/1990

\* cited by examiner

*Primary Examiner*—Steven A. Bratlie
(74) *Attorney, Agent, or Firm*—Donald Cayen

(57) ABSTRACT

A grain kit enables an agricultural forage box to also be used for handling grain. The kit includes a collector that mounts over the rear end of the forage box. The forage box rear gate may be held at a fixed slightly open position by the coaction of tabs on the rear gate and holding brackets fastened to the forage box side walls. The grain flows into the collector, from which it is discharged in a controlled stream through a floor opening. The discharge of the grain from the collector floor opening is controlled by a door. Apron chains on the forage box are controlled to suit the rate of discharge of the grain from the collector. A sweep brushes grain from the return runs of the apron chains. In a modified embodiment, an adjustment mechanism on the collector changes the pivoting of the rear gate.

62 Claims, 7 Drawing Sheets

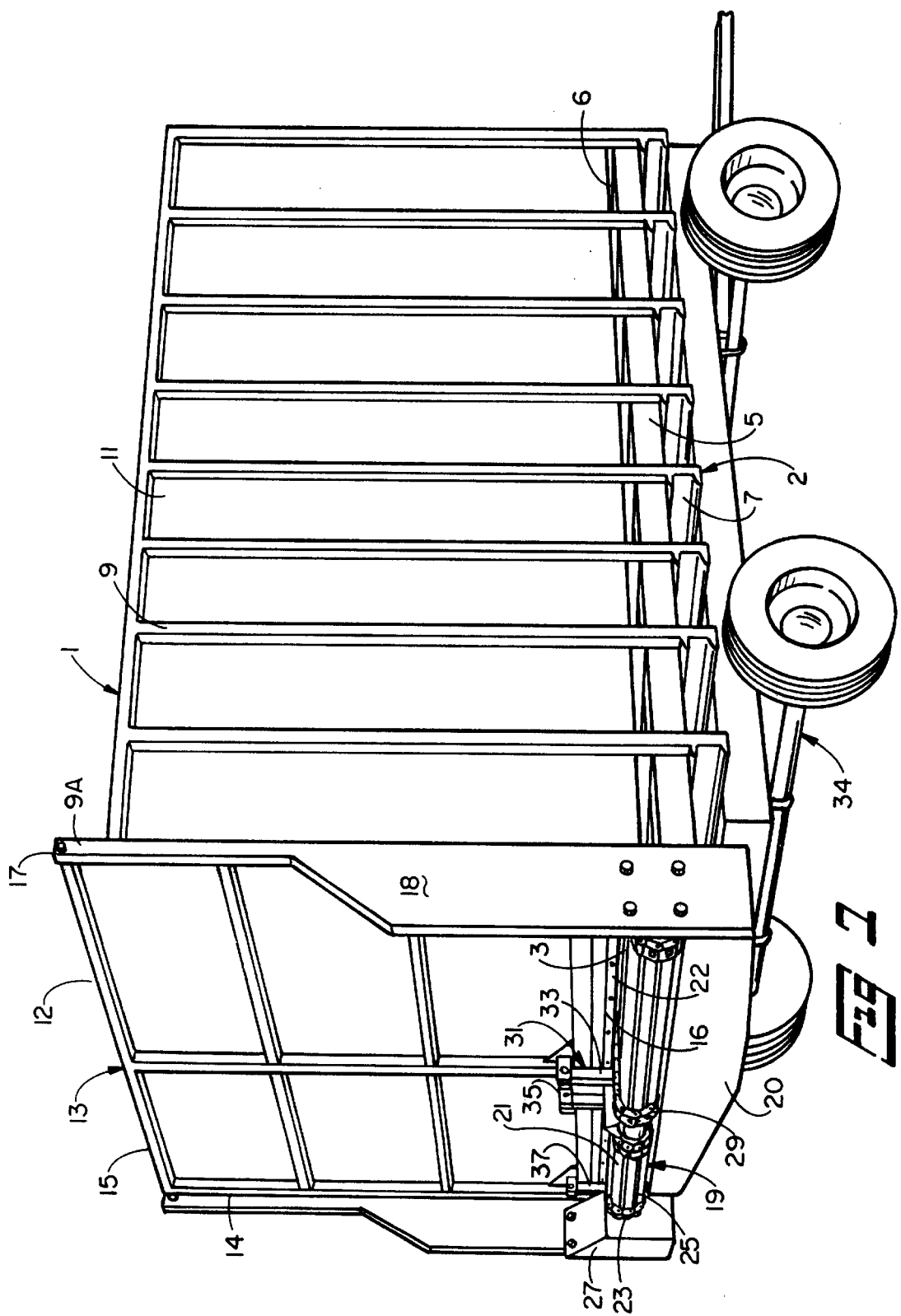

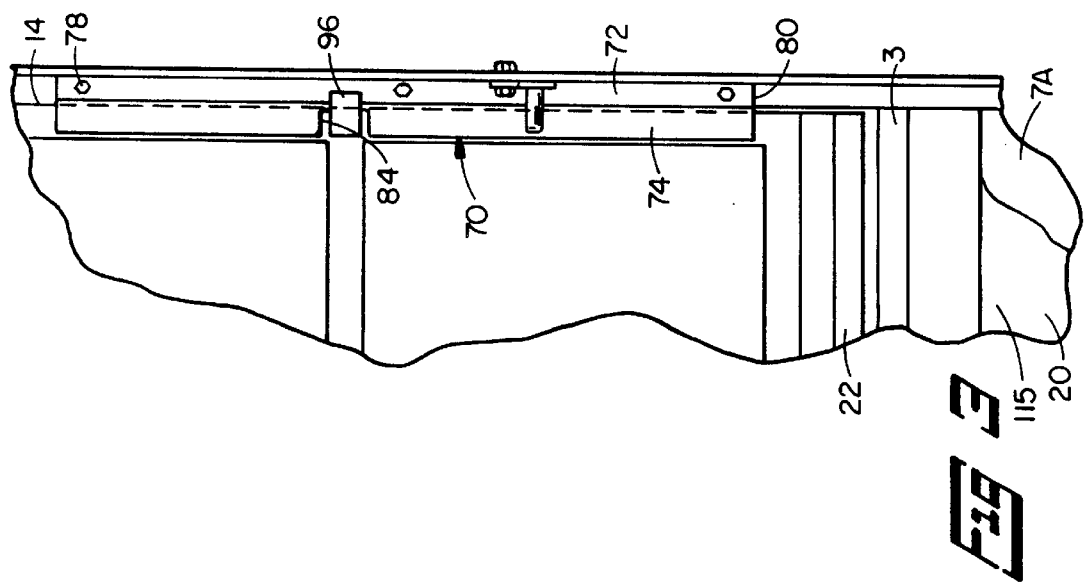
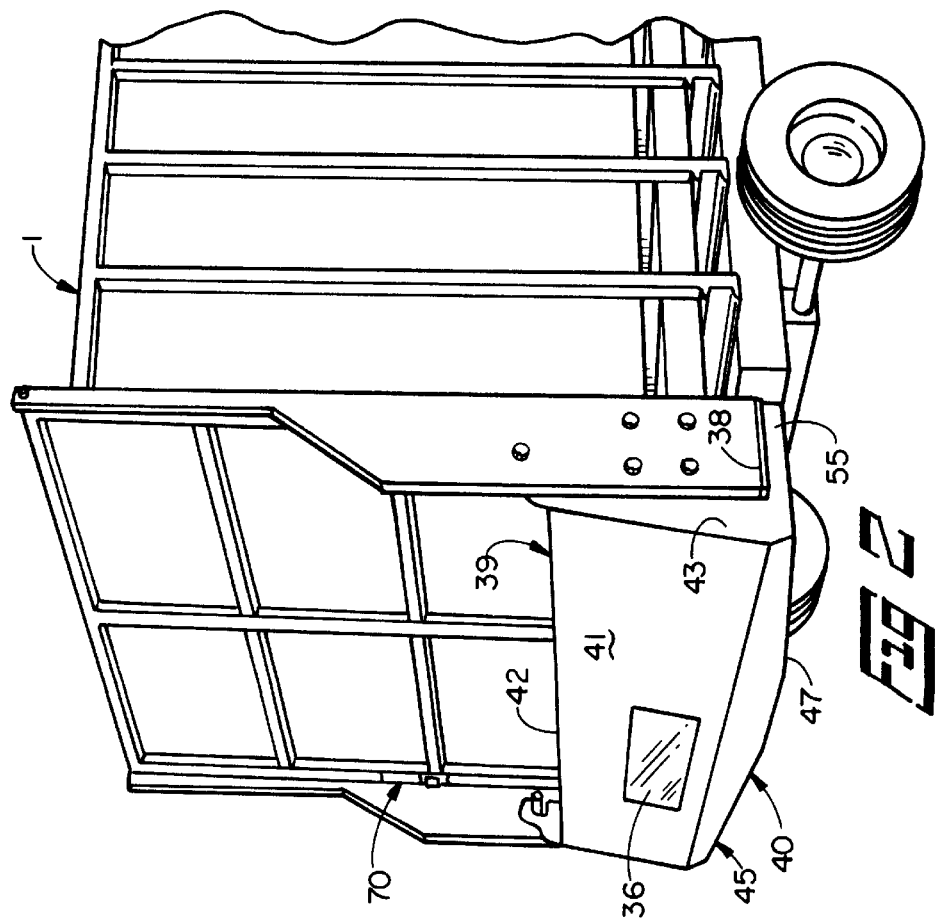

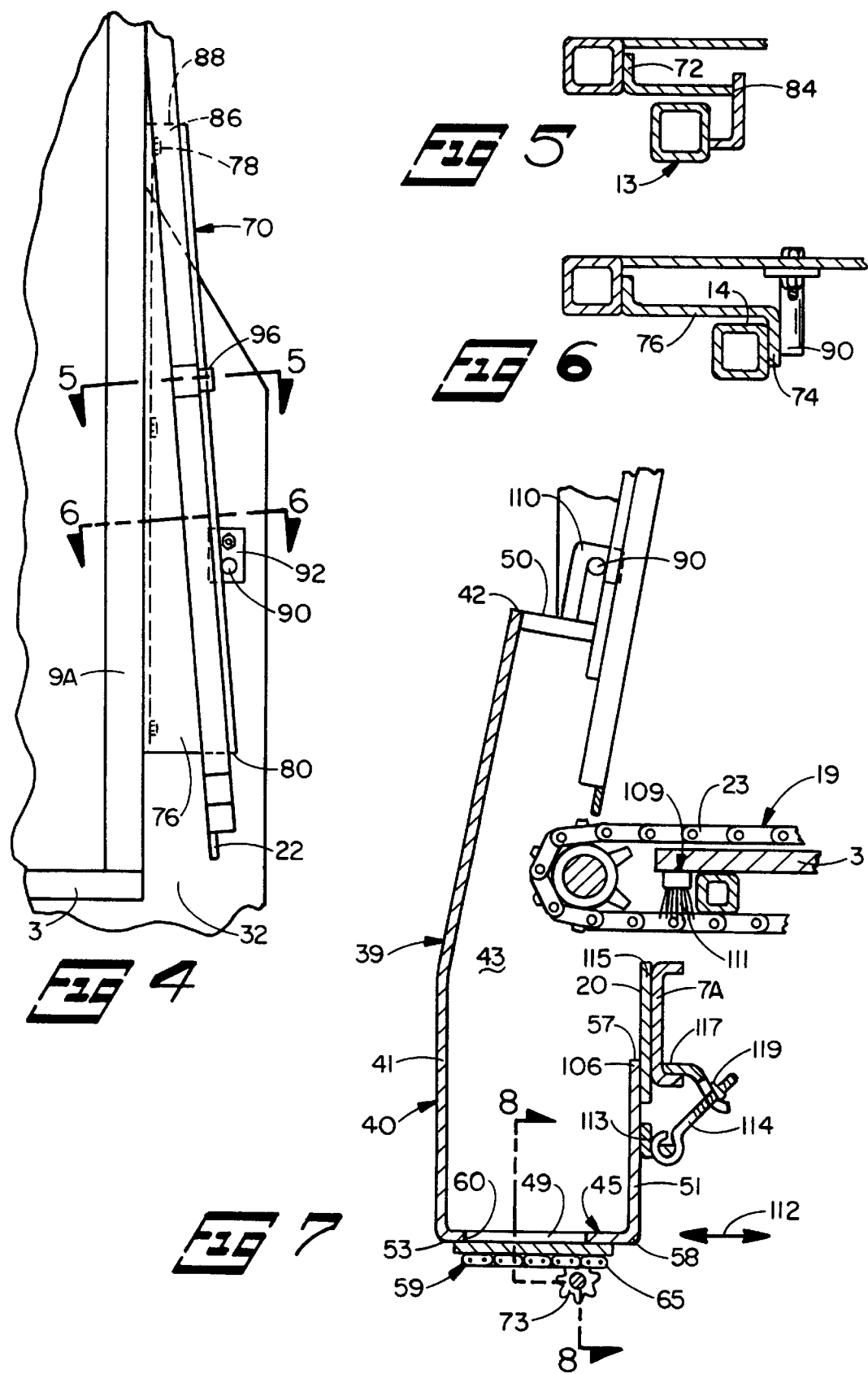

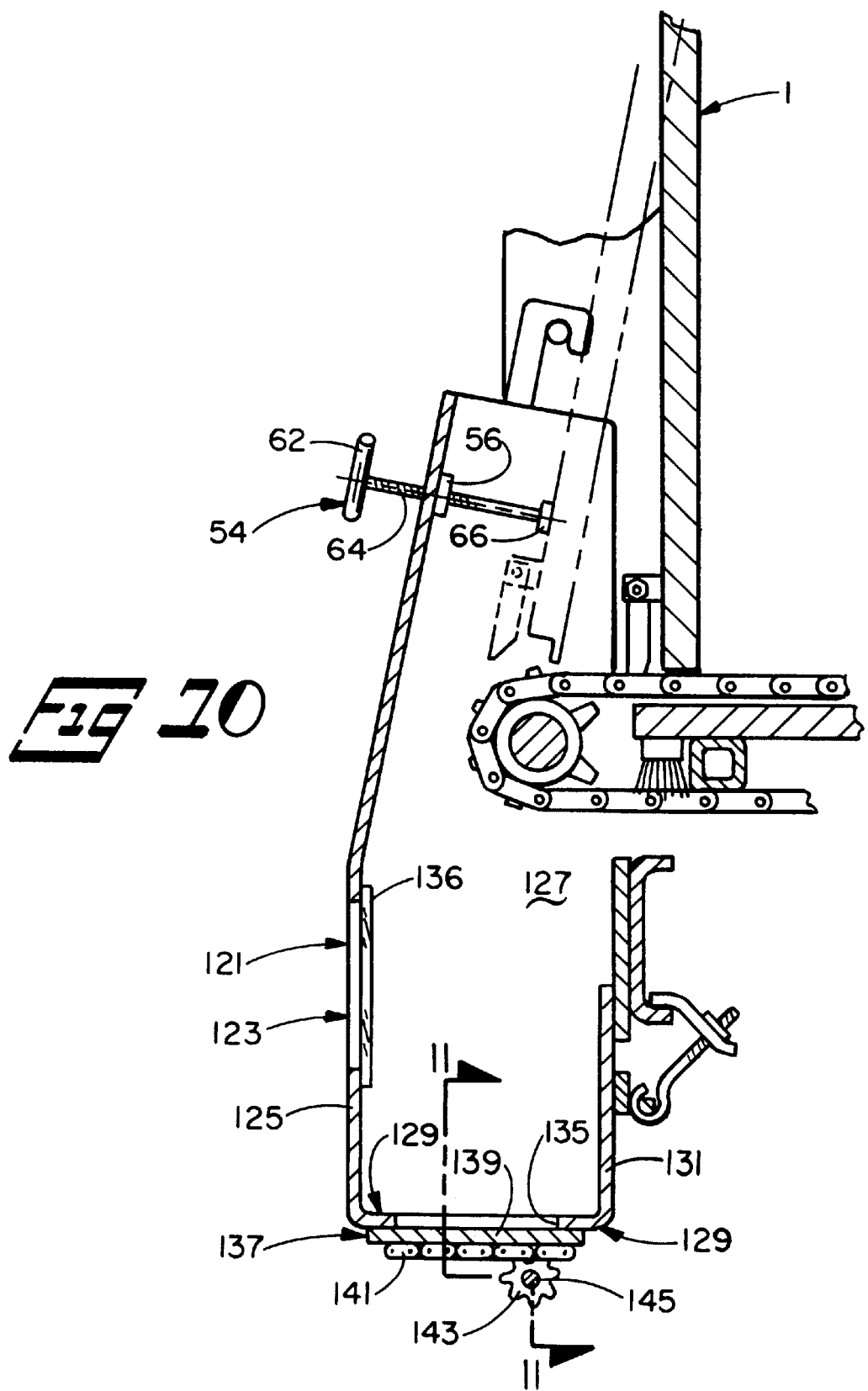

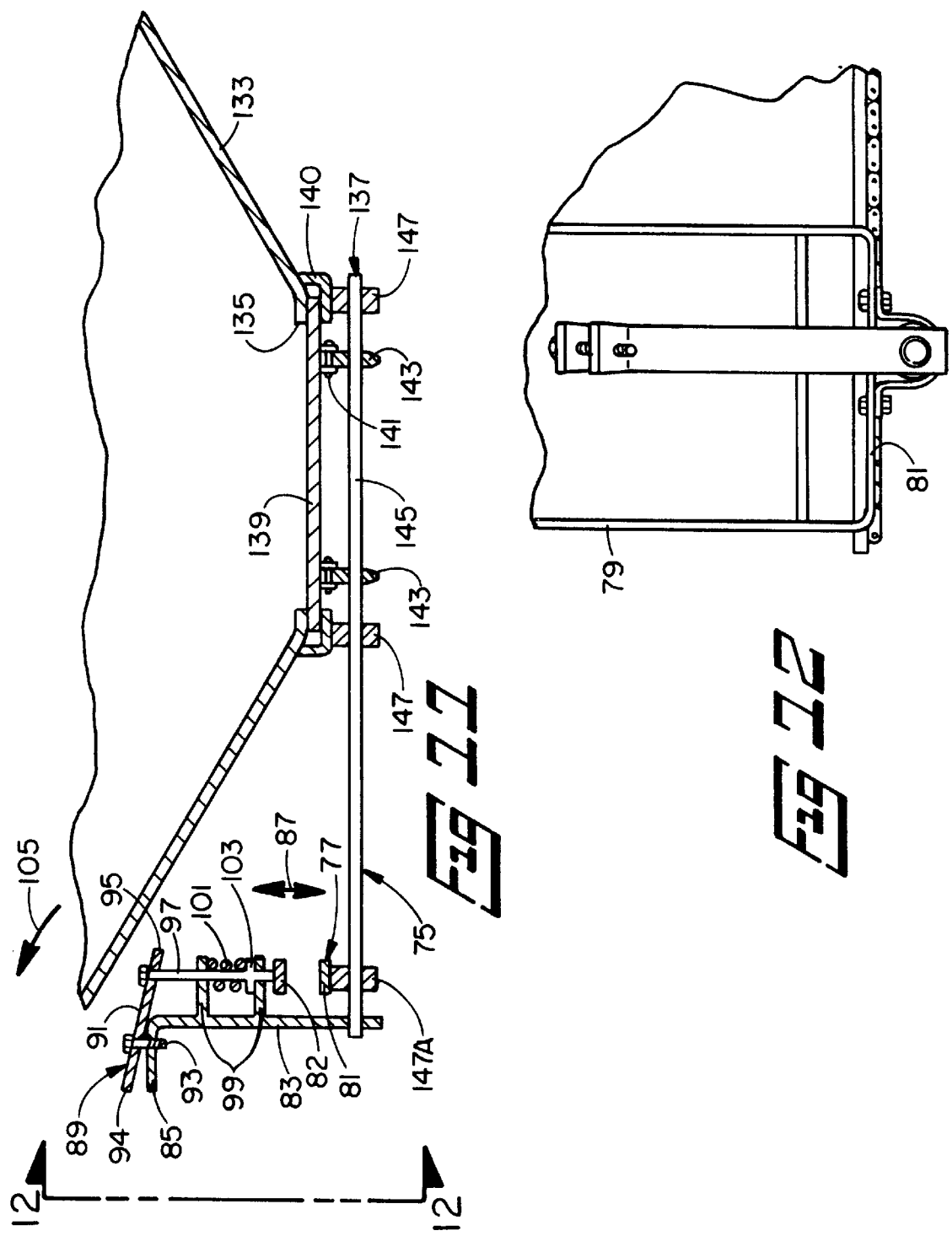

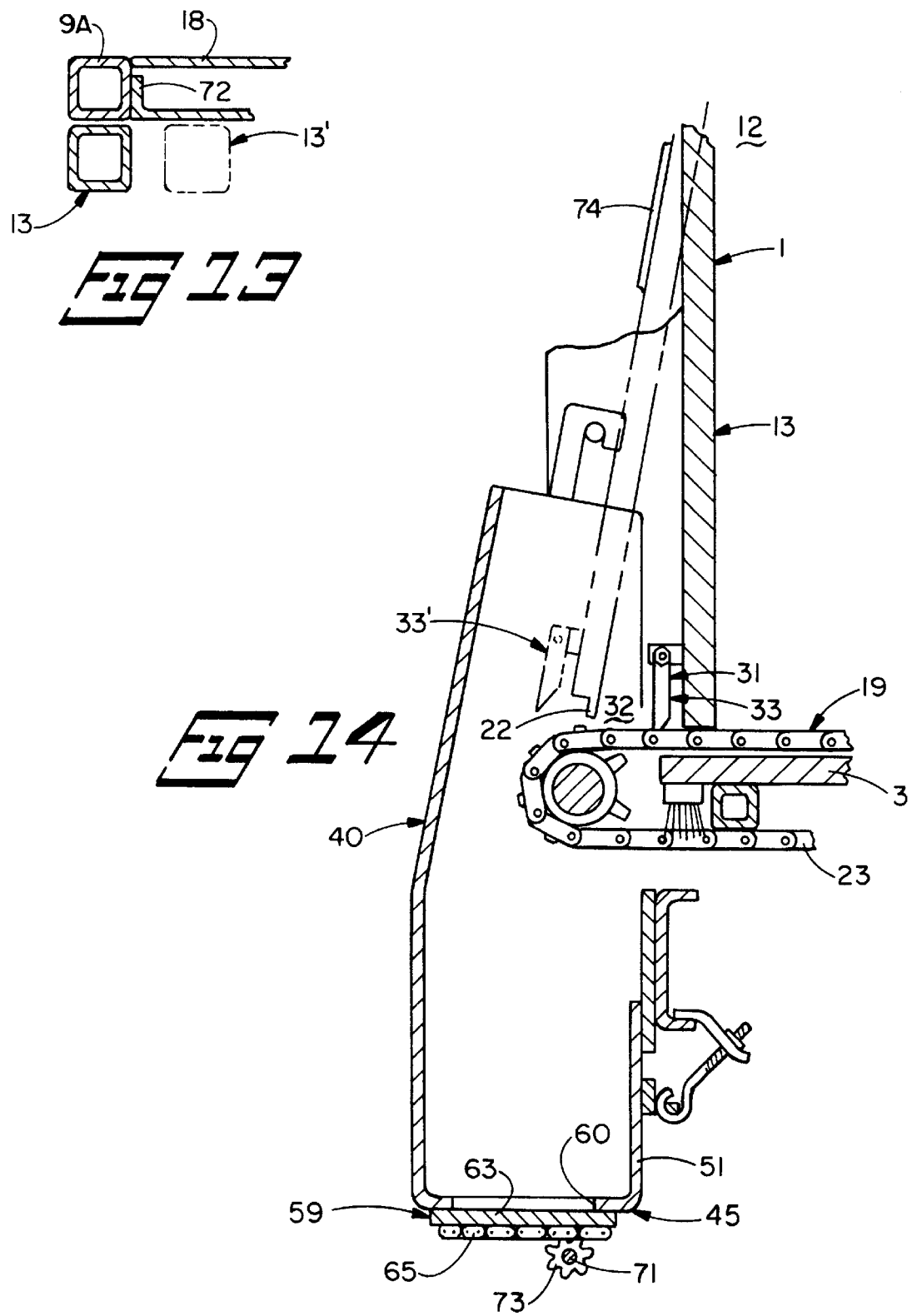

GRAIN KIT

BACKGROUND OF THE INVENTION

1. Field of the Invention

This invention pertains to agricultural equipment, and more particularly to apparatus for transporting grain in and unloading it from a storage container.

2. Description of the Prior Art

Handling harvested grain requires considerable care. The grain is valuable, so waste is to be prevented. On the other hand, it is also important for economic reasons to transport the grain from the field to a desired destination as quickly as practical.

Prior equipment for handling grain included gravity hoppers, which were often part of wheeled vehicles such as trailers. The hoppers usually had tapered side and/or bottom walls that funneled the grain to a bottom door. Grain fell out the door in a relatively small stream, which could then be directed by a conveyor or the like to a different location for further handling. Examples of prior hopper-type grain handling equipment may be seen in U.S. Pat. Nos. 3,746,395; 4,058,239; 4,258,953; 4,475,672; 5,782,524; 5,971,494; and 6,095,616.

U.S. Pat. No. 5,108,249 shows a grain trailer that unloads by means of a built-in conveyor. U.S. Pat. No. 4,415,303 shows an auger inside a trailer. U.S. Pat. No. 3,954,210 discloses a hopper with a dedicated conveyor outside of the hopper.

Although the equipment of the foregoing patents worked well for their intended purposes, they nevertheless had a serious drawback. In every case, the equipment was limited to handling only grain and similar uniform material. Accordingly, although the equipment was highly useful during the grain harvesting season, for most of the year the equipment was idle. Because the equipment was expensive, the idle time increased the time required to recover the initial investment.

Like grain handling equipment, forage boxes for handling agricultural forage are also well known and in widespread use. In recent years, it has become common to mount large forage boxes on the back chasses of trucks. The trucks are driven into the fields to directly receive forage cut by choppers and similar harvesting machinery. Alternately, the forage boxes can be mounted on large trailers, which are pulled by tractors. Forage boxes often include apron chains that propel the forage material horizontally along a bed to an unloading gate. The apron chains enable the forage to be unloaded through the gate onto the ground in a very rapid manner. Like the grain handling equipment discussed previously, the forage related equipment works very well. Also like the grain handling equipment, it is very expensive, especially if it is idle for much of the year.

In an ideal situation, forage boxes could also be used to handle harvested grain. That situation would eliminate the prior need for expensive separate equipment for hauling forage and grain. However, the seemingly simple solution of double use of prior forage boxes is not feasible. That is because a large amount of grain loaded in a forage boxes would uncontrollably spill onto the ground immediately upon opening the unloading gate. The monetary loss of the spilled grain, or of the time required to pick it up, would be intolerable. Further, even if the problems associated with the initial surge of spilling grain were solved, it would be very difficult to control the unloading of the rest of the grain from the forage box. That is because the apron chains would propel the grain across the entire width of the forage box bed. At the unloading gate, the grain would fall from the bed across its entire width. The wide stream of falling grain would be very difficult to manage and direct to a different location.

It is therefore highly desirable to further develop equipment for handling grain.

SUMMARY OF THE INVENTION

In accordance with the present invention, a grain kit is provided that enables particulate material to be unloaded through a wide container opening in a completely controlled manner. This is accomplished by collecting all the material that flows through the container opening into a collector and by controlling the discharge of the material from the collector.

The grain kit is designed to work especially well with a container having side walls, a horizontal bed, an open end, and a gate. The top of the gate is connected between the container side walls for pivoting about a horizontal axis. When the gate is in a closed position, it is substantially vertical and closes the container open end. When the gate is pivoted to an open position, an opening is created along the container bed between the side walls and under the gate bottom edge. By varying the amount the gate is pivoted open, the size of the container opening is also varied.

In the preferred embodiment, the grain kit comprises a pair of holding brackets, one fastened to each side wall of the container near the gate. Each holding bracket is made with a long stop strip that is at a slight angle to the vertical. The holding brackets are designed such that the gate abuts the stop strips after the gate has pivoted a small amount toward its open position. There are tabs on the gate that overlap the holding brackets. The gate tabs and the holding brackets coact to hold the gate in a fixed partially opened position. Consequently, there is a small fixed opening between the gate bottom edge and the container bed. A heavy horizontal pin is welded to each holding bracket.

The grain kit further comprises a collector that has a back panel, two side panels, and a front panel. There is a window in a back or side panel. A floor of the collector extends between the two side panels and the back and front panels. Preferably, the floor slopes downwardly from the side panels toward a horizontal floor opening. The collector has a door that is operable to open and close the floor opening. According to one aspect of the invention, operation of the door is controlled by a handwheel. The handwheel connects to a shaft having one or more sprockets. The sprockets mesh with corresponding chains secured to a plate. Turning the handwheel causes the sprockets to slide the plate horizontally to open or close the collector floor opening. The door may also include a lock that maintains the plate at a desired position over the collector floor opening.

The grain kit collector mounts to the container by hooking the collector over the holding brackets pins. The front panel seals against a seal surface on the container under the container bed. The collector floor opening is lower than the container bed.

In use, the collector floor opening is initially closed. When the container is filled with the particulate material, some of the material might flow through the opening under the gate bottom edge and into the collector. However, the collector can fill only to a maximum of the level of the container bed. The full container is hauled to a desired station for unloading. A conveyor or other implement is positioned under the collector floor opening.

The discharge of material out of the grain kit collector is controlled by the door. Turning the handwheel slides the plate to give a desired outlet size of the collector floor opening. The door is operated to allow only a desired flow rate of the material to fall through the collector floor opening and discharge onto the conveyor. If the container has apron chains for propelling the material along the bed, they also can be used to control the material flow rate, especially for material located remote from the gate. Ideally, the flow of material into the collector from the container equals the discharge of the material out of the collector floor opening. A sweep fastened to the container brushes any loose material from the apron chains back into the collector.

An alternate embodiment of the invention allows the gate to freely pivot between its fully closed position and an unchangeable partially open position. For that purpose, there are no tabs on the gate that coact with the holding brackets to hold the gate in a fixed partially open position. Instead, the gate is held in its closed position when it is initially filled with material by a latch mechanism that engages container apron chains. Because the gate is held closed, the grain kit collector need not be mounted to the container when the container is filled. At the unloading station, with the collector mounted to the container and the collector floor opening closed, the container apron chains are operated to disengage the latch mechanism. The weight of the material against the gate forces it toward its open position. The holding brackets limit the amount of gate pivoting to an unchangeable partially open position. The resulting small opening between the gate and the container bed enables the material to flow from the container into the collector.

An outstanding benefit of the grain kit of the invention is that it can be used with containers that handle materials other than particulate materials. When desired, the collector is unhooked from the holding brackets, and the holding brackets are removed from the container walls. The gate can then pivot to both its fully closed and fully opened positions in normal manner.

In a modified embodiment of the invention, the grain kit does not use holding brackets that hold the gate in a fixed slightly open position or limit gate pivoting to an unchangeable partially open position. Instead, the size of the opening between the container bed and the gate bottom edge is adjustable. For that purpose, the modified grain kit collector comprises one or more adjustment mechanisms that adjust the amount of pivoting of the gate. Preferably, each adjustment mechanism is a screw and nut arrangement. A threaded block is fixed to the collector back panel. A long shank passes through the back panel and threads into the block. The shank has a first end that is contactable with the gate. A second end of the shank is outside of the attachment where it is adjustable by a person. By placing the shank first end close to the gate when it is closed, the adjustment mechanism limits the amount the gate can open. The amount that the gate can open is changeable by adjusting the shank. Flow of material from the container into the collector can thus be controlled both by adjusting the gate pivoting and by operating the container apron chains.

The method and apparatus of the invention, using a grain kit collector removeably mounted around a long horizontal opening in a container, thus enables the container to handle materials of widely different physical characteristics. The probability of improper handling particulate material is minimal, because both the container opening size and the collector floor opening size are controllable.

Other advantages, benefits, and features of the present invention will become apparent to those skilled in the art upon reading the detailed description of the invention.

BRIEF DESCRIPTION OF THE DRAWINGS

FIG. 1 is a perspective view of a typical agricultural forage box with which the grain kit of the present invention is advantageously used.

FIG. 2 is a perspective view of the grain kit of the invention mounted to the forage box of FIG. 1.

FIG. 3 is a broken partial back view of the forage box showing a holding bracket of the invention fastened to the forage box.

FIG. 4 is a side view of FIG. 3.

FIG. 5 is a cross-sectional view taken along line 5—5 of FIG. 4.

FIG. 6 is a cross-sectional view taken along line 6—6 of FIG. 4.

FIG. 7 is a longitudinal cross-sectional view on an enlarged scale of the grain kit collector mounted on the back of the forage box.

FIG. 10 is a view generally similar to FIG. 7, but showing a modified embodiment of the invention.

FIG. 11 is a cross-sectional view taken along line 11—11 of FIG. 10.

FIG. 12 is an enlarged view taken along line 12—12 of FIG. 11.

FIG. 13 is a view generally similar to FIG. 5, but showing an alternate embodiment of the invention.

FIG. 14 is a view generally similar to FIG. 7, but showing an alternate way of using the invention.

DETAILED DESCRIPTION OF THE INVENTION

Figure 8:
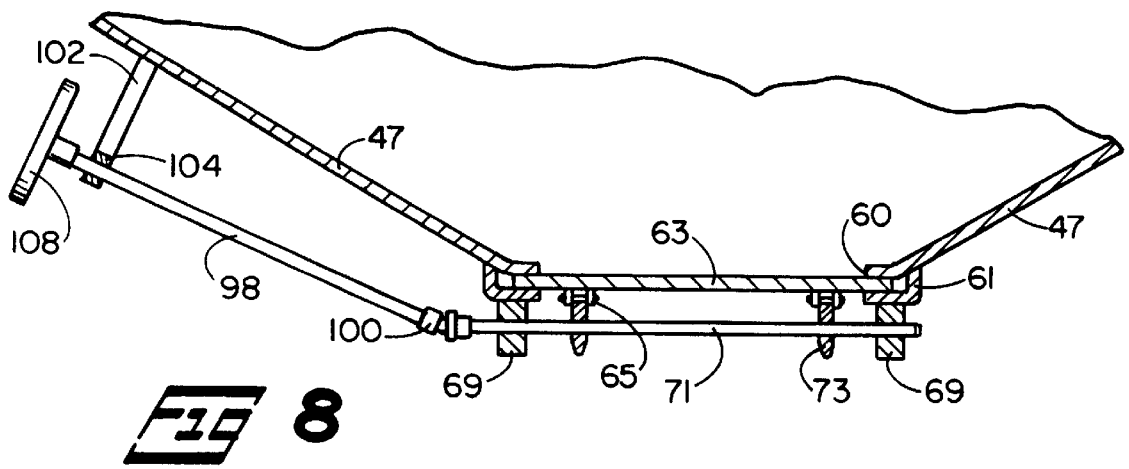
FIG. 8 is a cross-sectional view taken along line 8—8 of FIG. 7.

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Forage Box

Briefly by way of background, and referring to FIGS. 1 and 3, reference numeral 1 illustrates a typical agricultural forage box. Forage boxes are commercially available in different designs and sizes, and it will be understood that the present invention is not limited to use with any particular kind of forage box.

The particular forage box 1 shown comprises a sturdy frame 2 that includes longitudinally extending stringers 5 between upper cross members 6 and lower cross members 7. A bed 3 is supported on the upper cross members 6. Walls are supported by uprights 9 such that the forage box has two side walls 11 and a front wall, not shown. The rear end 12 of the forage box is open, but it is closeable by a rear gate 13. The rear gate 13 has vertical sides 14 and a bottom edge 16. A stiff seal 22 extends along the gate bottom edge 16. The top 15 of the rear gate pivots about a horizontal axis on the upper ends 17 of the rearmost frame uprights 9A. A guide plate 18 projects rearwardly from each rearmost frame upright 9A. On the rearmost lower cross member 7A of the frame 2 is a trim sheet 115 with a vertical seal surface 20.

The forage box 1 is typically part of a wheeled vehicle. In some instances, the forage box is mounted on the back chassis of a truck. In other instances, as is illustrated in FIG. 1, the forage box is mounted on a large trailer 34 that is pulled by a tractor. The present invention is equally useful for both truck and trailer mounted forage boxes.

The forage box 1 illustrated further comprises an apron chain system 19. The apron chain system 19 is comprised of two flights 21, each having two chains 23 and longitudinally spaced flight bars 25 between the chains. The flight bars 25 of a top run of each flight 21 are on top of the forage box bed 3. A return run of each flight is under the bed, but is above the rearmost crossmember 7A and the trim sheet 115. Each chain 23 engages a sprocket 29. A conventional drive train 27 rotates a shaft on which the sprockets 29 are secured. Operating the drive train 27 causes the top runs of the flights 21 to advance toward the forage box open rear end 12. Power to drive the drive train may be supplied by a hydraulic system, either from the truck on which the forage box is mounted, or from the tractor that pulls a trailer mounted forage box. Alternately, the drive train can be powered from a power takeoff of a tractor. Both hydraulic and power takeoff power systems are conventional and form no part of the present invention.

The illustrated forage box 1 further has a latching mechanism 31 for the rear gate 13. The latching mechanism 31 comprises a latch 33 in operative association with one or more chains 23. An upper end 35 of each latch 33 is pivotally connected to the rear gate above an associated chain. A lower end 37 of each latch engages a link of the chain. The latches lower ends 37 coact with the chains to prevent opening of the rear gate.

When the drive train 27 is operated to advance the flight top runs toward the forage box open end 12, the latches lower ends 37 travel with the chains 23. The weight of forage in the forage box 1 on the rear gate 13, plus the force of the forage as it is propelled by the chain system 19, causes the rear gate to pivot such that a horizontal opening is created between the rear gate seal 22 and the forage box bed 3 for the full width between the side walls 11. Further chain advancement causes the latches 33 to disengage from the chains, at which point the rear gate is free to open completely. The chain system 19 is operated until all the forage has been unloaded.

Grain Kit Holding Bracket

In accordance with the present invention, a grain kit 39 is removeably mountable on the forage box 1, FIG. 2. The grain kit 39 enables the forage box to handle grain as well as forage. The grain kit mounts to the forage box to catch grain that flows from the forage box bed 3 through the opening under the rear gate seal 22. The kit also discharges the grain in a controlled manner to an implement that transports it away from the forage box to a desired location.

In the particular construction shown in FIGS. 2–7, the grain kit 39 is comprised of a collector 40 and a pair of holding brackets 70. Looking at the holding brackets 70, each has a first leg 72, a stop strip 74, and a center web 76. The first leg 72, stop strip 74, and center web 76 are arranged into a Z-shape as viewed from the holding bracket ends. The stop strip makes an angle of approximately five degrees to ten degrees with the first leg, and the first leg and stop strip diverge toward the holding bracket bottom 80. Consequently, the center web has a triangular shape when viewed from the side. There is a gap 86 between the first leg and the stop strip at the holding bracket top 88. There is a notch 84 in the stop strip.

Welded to each holding bracket stop strip 74 is a heavy pin 90. The pin 90 overhangs the stop strip. On the free end of the pin is a small plate 92 that is parallel to the center web 76.

Each holding bracket 70 is mounted to a forage box rearmost upright 9A. Mounting is achieved by fastening the holding bracket first leg 72 to the container rearmost upright using fasteners 78. The stop strips 74 overlie the rear gate sides 14. Consequently, the rear gate 13 can pivot toward its open position only until it abuts the holding brackets stop strips.

There is a right-angle tab 96 on the rear gate 13 near each side 14 thereof. The notches 84 in the holding brackets 70 are located such that the gate tabs 96 pass through them. The tabs are so dimensioned that they contact the holding brackets center webs 76 when the rear gate abuts the stop strips 74. As a result, the rear gate is held in a slightly open position by the coaction of the tabs and the holding brackets. A small fixed horizontal opening 32 is thus created between the gate seal 22 and the forage box bed 3.

Grain Kit Collector

The grain kit collector 40 has a back panel 41, opposed vertical side panels 43, a floor 45, and a front panel 51. The back panel 41 has a horizontal top edge 42 and a lowermost edge 53. As illustrated, the back panel 41 diverges from the front panel 51 in the direction of the floor 45. Each side panel 43 has a top edge 50 in line with the back panel top edge 42 and a ledge 55. A heavy seal 38 is bonded to the ledge 55. On the top edge 50 of each side panel 43 is a hook 110.

The floor 45 is made up of two angled panels 47 that connect to the back, side, and front panels. The floor angled panels 47 slope downwardly and terminate in respective free edges 49. The front panel 51 has an upper edge 57 that is only a short distance above the side panels free edges 49. A bottom edge 58 of the front panel cooperates with the floor panels free edges 49 and the back panel lowermost edge 53 to define a horizontal floor opening 60.

An angle or similar member 113 is welded to the outside of the collector front panel 51 on each side of the floor opening 60. Each angle 113 has a slot through it. The eye of an eyebolt 114 is captured to swivel in the slot of each angle.

It will be appreciated that the size of the grain kit collector 40 will vary to suit the particular forage box 1. For a typical commercially available forage box, the collector has a width of eight feet six inches between the side panels 43, and a height of four feet six inches between the back panel top edge 42 and lowermost edge 53. A height of approximately three feet and a width of approximately 15 inches for the side panels is satisfactory. A floor opening 60 of approximately 24 inches by 15 inches works very well.

In the collector back panel 41 is an opening covered by a window 36. The window 36 is preferably offset from the back panel lowermost edge 53. A window size of approximately ten inches wide and 22 inches high works very well, with the bottom of the window being approximately 12 inches above the back panel lowermost edge. A window made of a break-resistant clear acrylic material is preferred.

Figure 9:
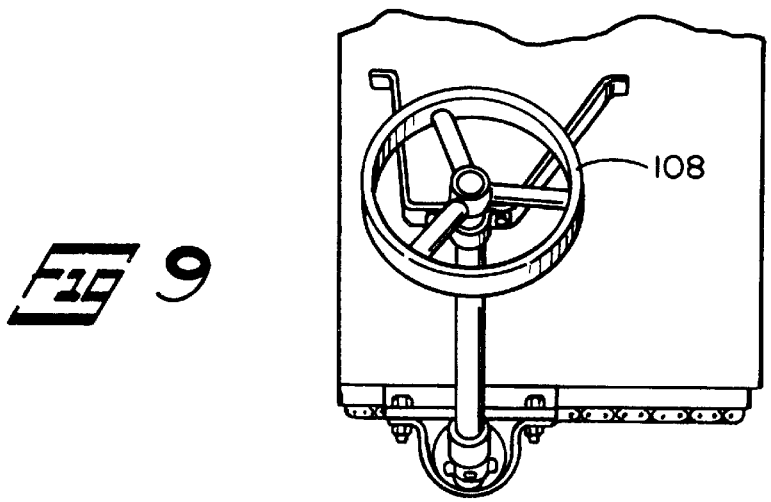
FIG. 9 is an enlarged side view of FIG. 8.

The grain kit 39 further comprises a door 59 in conjunction with the collector floor opening 60. In the preferred embodiment, the door 59 is comprised of a pair of horizontal allochiral angles 61 welded or otherwise joined to the floor angled panels 47 on opposite sides of the floor opening. Also see FIGS. 8 and 9. A plate 63 is slidably supported on the angles 61. To the underside of the plate 63 are secured the ends of two lengths of link chains 65. Supported by each angle 61 is a bearing 69. A first shaft 71 is rotatable within the bearings 69. The first shaft 71 carries two sprockets 73. Each sprocket 73 meshes with a chain length 65.

The door 59 further comprises a second shaft 98 connected to the first shaft 71 by a universal joint 100. The second shaft 98 is supported by a bearing 104 that is part of a hanger 102. The hanger 102 is suspended from a collector floor angled panel 47. A handwheel 108 is on the end of the second shaft. Turning the handwheel 108 causes the plate 63 to slide in the angles 61 in the directions of arrows 112.

Operation

The grain kit collector 40 is mounted to the forage box 1 using a fork lift truck, front end loader, skid steer, or other conventional lifting equipment commonly used on farms. The collector mounts to the holding brackets 70 by first tilting the collector such that the hooks 110 are closer to the forage box 1 than the collector floor 45. The hooks are hooked over the holding brackets pins 90. The collector is swung downwardly such that the front panel 51 contacts the forage box trim sheet seal surface 20. The seals 38 on the collector side wall ledges 55 seal against the bottom edges of the guide plates 18. The grain kit collector covers approximately the lower third of the forage box rear gate 13. The collector is so dimensioned that the front panel upper edge 57 is below the return runs of the chains 23.

To maintain the collector front panel 51 tightly against the forage box trim sheet seal surface 20, the forage box is modified slightly by the addition of a pair of angled forks 117. Each fork 117 is welded to the forage box rearmost lower cross member 7A in longitudinal alignment with the eyebolts 114 on the collector. The eyebolts are swung into the spaces between two fingers of each fork. By tightening nuts 119 on the eyebolts, a margin 106 of the collector front panel 51 along its upper edge 57 is drawn up tightly against the trim sheet seal surface 20. If desired, a seal can be bonded to the front panel along the margin 106.

The forage box 1 is hauled to a field in normal manner for filling with grain. Prior to filling the forage box, the grain kit collector floor opening 60 is closed. In some situations, such as when the grain is very dry, grain will flow by gravity through the opening 32 into the collector 40, where it collects on the closed door plate 63. However, the grain cannot flow to a height higher than the opening 32. Because of the fixed slightly open position of the rear gate 13, small triangular openings are present between the gate sides 14 and the container rearmost uprights 9A. The center webs 76 of the holding brackets 70 prevent any grain from spilling out those triangular openings. After the forage box has been filled, it is hauled to the desired unloading station.

At the unloading station, a conveyor or other transport implement is positioned under the collector floor opening 60. The door handwheel 108 is turned to open the floor opening slightly. Grain in the collector 40 discharges by falling onto the conveyor for transport to a different location for further processing. The amount of door opening is determined by the speed with which the conveyor can remove the discharged grain. During the discharge process, additional grain may flow by gravity from the forage box 1 through the opening 32 into the collector.

When all the grain in the collector 40 has been discharged, and no more flows by gravity through the opening 32 from the forage box 1 into the collector, the forage box chain system 19 is operated to advance the flight bars 25 in the top runs toward the forage box rear end 12. Doing so propels the grain to the forage box rear end. Simultaneously, if necessary, the collector door 59 is controlled to discharge the grain at the rate that is accommodated by the conveyor. Despite the height of the collector top edges 42 and 50 above the ground, the window 36 enables the operator to see the amount of grain in the collector and thereby guides him to control both the forage box chain system and the collector door. Such dual control of the grain discharge is important for handling grain of different characteristics, such as when it is dry or wet.

Alternately, the rear gate 13 need not be held at a fixed partially open position while the forage box 1 is being filled and hauled. Looking at FIGS. 13 and 14, there are no tabs on the rear gate 13 analogous to the tabs 96 that were described previously in connection with FIGS. 3–5. Consequently, the rear gate is able to pivot to its fully closed position alongside the forage box frame rearmost uprights 9A. The rear gate is held in its closed position by the latching mechanism 31. That is, the latches 33 engage the chains 23 when the rear gate is closed. In that situation, it is not necessary that the grain kit collector 40 be mounted to the forage box while the forage box is being filled or hauled.

At the unloading station, with the grain kit collector 40 mounted to the forage box 1, the collector door 59 is operated to close the floor opening 60. The forage box chain system 19 is operated to advance the chains 23 toward the forage box rear end 12. That action moves the latches 33 out of engagement with the chains, as shown at reference numeral 33'. The weight of the grain in the forage box pushes the rear gate 13 to pivot toward its open position. Pivoting is limited to an unchangeable partially open position by abutment of the rear gate, as shown at reference numeral 13' in FIG. 13, against the holding brackets stop strips 74. Grain then flows through the resulting opening 32 between the rear gate seal 22 and the forage box bed 3, and the unloading of the grain proceeds as previously described in connection with FIGS. 1–9.

Forage Box Modifications

As mentioned, the forage box 1 is modified to suit the grain kit 39 by the addition of the forks 117. In addition, the forage box is modified to minimize wasting of grain. Because of the high value of the grain handled by the forage box and grain kit, it is important that none be lost during the hauling and unloading processes. As the forage box chain system 19 is operated to propel the grain to the forage box rear end 12, there is a tendency for some grain kernels to remain on the upper surfaces of the flight bars 25 of the return runs. To prevent those kernels from spilling off the flight bars onto the ground and being wasted, the present invention further comprises a sweep 109. According to one aspect of the invention, the sweep 109 is composed of a pair of brushes 111. Each brush 111 has a holder that is fastened to the underside of the forage box bed 3. Bristles in the holders are struck by the flight bars of the return runs, thereby sweeping any grain off the flight bars. The brushed grain falls onto the collector floor 45.

Modified Embodiment

Turning to FIGS. 10–12, a modified grain kit 121 is depicted. The grain kit 121 is used with the forage box 1 as previously described. The grain kit 121 has a collector 123, but it does not have components analogous to the holding brackets 70 of the grain kit 39 described previously.

The collector 123 of the grain kit 121 comprises a back panel 125, vertical side panels 127, a floor 129, and a front panel 131. The floor 129 is made up of two angled panels 133 that slope downwardly to a floor opening 135. There is a window 136 in the collector 123, preferably in the back panel 125.

Also in the collector back panel 125 are a couple of adjustment mechanisms 54. Each adjustment mechanism 54 is comprised of a heavy threaded block 56 welded or otherwise joined to the back panel near a side panel 127. A long threaded shank 64 with a T-handle 62 passes through a hole in the collector back panel and threads into the block 56. On one end of the shank 64 is an enlarged pad 66. It is preferred that the longitudinal axes of the T-handle shanks slope downwardly toward the collector front panel 131 at an angle A relative to the horizontal. A satisfactory angle A is between approximately five degrees and ten degrees. A suitable location for each block is approximately 17 inches from the back panel top edge 42 and approximately four inches from a side panel.

The grain kit collector 123 further comprises a door 137 in conjunction with the floor opening 135. The door 137 has a plate 139 with chain lengths 141. The plate 139 is slidable within angles 140. A sprocket 143 meshes with each chain length 141. The sprockets 143 are carried on a shaft 145 that is supported by first bearings 147 on the angles 140.

The shaft 145 is further supported by a third bearing 147A. The bearing 147A is part of a hanger 77. The particular hanger 77 illustrated has a pair of vertical bars 79 suspended by their upper ends to one of the collector angled floor panels 133. A horizontal bottom bar 81 is joined to the lower ends of the vertical bars 79. The bearing 147A is supported by the bottom bar 81. There is also a cross bar 82 on the hanger above the bottom bar.

The door 137 further comprises a handle 75. The handle 75 includes a crank 83 with one end joined to the shaft 145, and with a bent-over hand grip 85 at the other end. By turning the crank 83, the door plate 139 slides within the angles 140 to open and close the collector floor opening 135.

To maintain the door plate 139 at a desired position over the collector floor opening 135 without having to hold the crank 83, the door 137 further comprises a lock 89. In the particular lock 89 shown, a lever 91 is pivotally joined, as by a loose fitting fastener 93, to the crank grip 85. One end 94 of the lever 91 overlies the crank grip. A rod 97 is pivotally connected to the second end 95 of the lever. The rod 97 is guided for reciprocation in a pair of small lugs 99 that are part of the crank 83. A spring 101 acts between one of the lugs 99 and a collar 103 on the rod to urge the rod in a downward direction and into contact with the hanger cross bar 82. In that manner, the crank 83 is prevented from unattended turning.

To turn the crank 83, a person must grasp the lever end 94 along with the crank grip 85 and pivot the lever 91 in the direction of arrow 105. Doing so disengages the rod 97 from the hanger cross bar 82 and thereby enables the crank 83 to rotate the shaft 145.

When using the grain kit 121, the forage box rear gate 13 is initially held closed by the latches 33. The grain kit collector T-handles 62 are adjusted such that the pads 66 are only a few inches from the rear gate. The collector door 137 closes the floor opening 135. After the forage box has been filled, it is hauled to the desired unloading station.

At the unloading station, the forage box chain system 19 is operated to advance the flight bars 25 in the top runs toward the forage box rear end 12. Doing so also moves the latches lower ends 37 with the chains 23. The force of the grain on the rear gate 13 pivots it open to the extent allowed by the coaction of the latches 33 and the chains. Even a slight pivoting of the rear gate creates the long horizontal opening 32 between the bottom seal 22 of the rear gate and the forage box bed 3. In those situations, the forage box chain system is operated only momentarily such that the chain bars advance, but the latches 33 do not disengage from the chains 23. The resulting opening 32 is sufficient to allow only an initial surge of grain to flow into the collector 123.

The collector door 137 is operated by releasing the lock 89 and turning the crank 83 and thus sliding the plate 139. The plate is slid only enough to allow a controlled amount of grain to discharge through the floor opening 135. The grain falls from the collector 123 in a concentrated stream onto a conveyor or other transport implement, not shown.

The adjustment mechanism T-handles 62 are turned as necessary to change the size of the opening 32 to obtain the desired grain flow from the forage box 1.

It will be appreciated that the door 137 described in conjunction with the grain kit 121 is also applicable to the grain kit 39 of FIGS. 1–9. Moreover, the door 59 with the handwheel 108 and universal joint 100 may be used with the grain kit 121 of FIGS. 10–12, if desired. When using the grain kit 121, the pivoting of the rear gate creates triangular openings between the rear gate sides 14 and the forage box rearmost uprights 9A. To prevent grain from flowing through the triangular side openings, stiff seals are added to the rearmost uprights. The seals contact the rear gate sides. Alternately, the seals can be affixed to the forage box guide plates 18 for contacting the rear gate sides.

In summary, the results and advantages of agricultural forage boxes can now be more fully realized. The grain kit 39 provides both the ability for a conventional forage box 1 to handle grain, as well as controlled unloading of the grain from both the forage box and the grain kit. This desirable result comes from using the combined functions of the holding brackets 70 and the collector 40. The holding brackets hold the forage box rear gate 13 at a fixed slightly open position. Alternately, the rear gate may be allowed to pivot between its fully closed position and a limited and unchangeable slightly open position. In that embodiment, the rear gate is held at its fully closed position by the engagement of the latches 33 with the chain system 19. Operating the chain system disengages the latches and allows the rear gate to pivot open until it abuts the holding brackets. The collector collects grain that flows through the opening 32 between the forage box bed 3 and the bottom seal 22 of the rear gate. The grain in the collector is discharged in a concentrated stream through the floor opening 60 to a conveyor or other transport implement for further processing. The door handwheel 108 is operated to slide the plate 63 and thereby control the discharge from the collector at a rate that suits the grain transporting conveyor. Simultaneously, the forage box chain system 19 is operated to match the quantity of grain flowing into the collector from the forage box with the quantity discharged from the collector. The window 36 enables a person to easily determine the quantity of grain in the collector and thereby properly control the forage box chain system and the collector door. The sweep 109 assures that grain tending to be carried back under the forage box by the return runs of the chain system flight bars 25 does not spill to the ground and be wasted. The modified grain kit 121 does not use the holding brackets 70, but instead uses the adjustment mechanisms 54. The adjustment mechanisms prevent excessive pivoting of the rear gate after the chain system has advanced enough to disengage from the latches 33. The modified door 137 includes the lock 89 that maintains the door plate 139 at the desired position relative to the collector floor opening 135 without constant attention.

It will also be recognized that in addition to the superior performance of the grain kit, its construction is such as to be of modest cost in relation to the benefits it provides. In fact, its initial cost is recovered quickly, because it allows a single forage box 1 to perform the double duty of handling both forage and grain. Further, because it is made of a simple design and with rugged components, the grain kit gives long service life with minimal maintenance.

Thus, it is apparent that there has been provided, in accordance with the invention, a grain kit that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. Apparatus for handling grain comprising:
   a. a forage box comprising:
      i. a frame;
      ii. a bed supported on the frame and lying in a generally horizontal plane, and opposed side walls with an open rear end;
      iii. a rear gate proximate the rear end and having a bottom edge, and a top pivotally connected to the side walls, the rear gate being selectively pivotable toward an open position to create a horizontal opening between the forage box bed and the rear gate bottom edge, and to a closed position that substantially eliminates the opening between the rear gate bottom edge and the forage box bed; and
      iv. a chain system comprising multiple flight bars that operate to advance along the forage box bed toward the rear end and thereby propel grain in the forage box toward the rear end, the chain system flight bars having respective return runs under the forage box bed; and
   b. a grain kit removeably mounted to the forage box at the rear end thereof comprising:
      i. a collector having side panels, a back panel, a front panel, and a floor that defines a floor opening therethrough, the floor being at a lower level than the forage box bed; and
      ii. a door operable to selectively open and close the collector floor opening,
         so that grain in the forage box is propelled by the chain system to the forage box rear opening to flow from the forage box bed onto the collector floor, and grain in the collector is discharged through the floor opening therein by operating the door.

2. The apparatus of claim 1 wherein the grain kit collector front panel seals against a seal surface on the forage box to thereby prevent grain from spilling between the forage box bed and the collector front panel.

3. The apparatus of claim 1 wherein:
   a. the grain kit collector floor comprises angled panels having respective free edges that cooperate with the back and front panels to define the floor opening; and
   b. the door comprises:
      i. a plate slidably supported adjacent the collector bottom opening;
      ii. a hanger suspended from a selected one of the collector floor angled panels;
      iii. a shaft rotatably supported on the hanger;
      iv. a crank on the shaft; and
      v. means for sliding the plate in response to turning the crank.

4. The apparatus of claim 3 further comprising means for locking the crank against turning.

5. The apparatus of claim 3 wherein the door further comprises:
   a. a lever on the crank;
   b. a rod connected to the lever; and
   c. means for releasably contacting the rod with the hanger to prevent turning the crank when the rod contacts the hanger.

6. The apparatus of claim 1 wherein the grain kit collector further comprises a window in a selected panel that enables a person to see the amount of grain in the collector.

7. The apparatus of claim 6 wherein the window is in the grain kit collector back panel.

8. The apparatus of claim 1 wherein the grain kit collector further comprises means for adjusting the pivoting of the forage box rear gate.

9. The apparatus of claim 1 wherein the grain kit collector further comprises:
   a. at least one threaded block joined to the back panel; and
   b. a shank threaded through the threaded block and having an end that is contactable with the rear gate.

10. The apparatus of claim 8 wherein the means for adjusting the pivoting of the rear gate comprises:
    a. at least one threaded block on the grain kit collector back panel; and
    b. a shank threaded through the block and having a first end with a pad thereon proximate the rear gate, and a second end with a handle on the opposite side of the back panel as the first end,
       so that adjusting the handle adjusts the position of the pad relative to the rear gate and thereby changes the amount the rear gate can pivot toward its open position.

11. The apparatus of claim 10 wherein the threaded shank has a longitudinal axis that makes an angle of between approximately five degrees and ten degrees with the plane of the forage box bed.

12. The apparatus of claim 1 further comprising means for sweeping grain that remains on the chain system flight bars return runs into the collector.

13. The apparatus of claim 12 wherein the means for sweeping grain comprises at least one brush fastened to the forage box bed and contactable by the return runs of the chain system flight bars,
    so that grain on the return runs of the flight bars is swept off the flight bars.

14. The apparatus of claim 1 wherein:
    a. the grain kit further comprises a pair of holding brackets each fastened to an associated container side wall; and
    b. the forage box further comprises means for coacting with the holding brackets to hold the rear gate in a fixed slightly open position whereat there is a small horizontal opening between the forage box bed and the rear gate bottom edge.

15. The apparatus of claim 14 wherein each holding bracket comprises:
    a. a first leg fastened to the associated forage box side wall;
    b. a center web joined to the first leg and generally perpendicular thereto; and
    c. a stop strip joined to the center web and generally perpendicular thereto, the stop strip overlying the forage box rear gate, the stop strip enabling the rear gate to pivot to a partially open position until the rear gate abuts the stop strip.

16. The apparatus of claim 14 wherein the means for coacting with the holding brackets comprises a pair of tabs on the rear gate each in operative association with a respective holding bracket to hold the gate in the fixed slightly open position.

17. The apparatus of claim 15 wherein:
    a. each holding bracket defines a notch in the stop strip thereof; and b. the means for coacting with the holding brackets comprises a pair of tabs on the rear gate, each tab being located in a notch of the associated holding bracket and coacting with the holding bracket to hold the rear gate in the fixed slightly open position.

18. The apparatus of claim 14 wherein:

a. each holding bracket further comprises a pin generally parallel to the forage box bed; and b. the collector includes hooks that hook over the holding bracket pins to thereby removeably mount the collector to the holding brackets.

19. The apparatus of claim 2 further comprising means for maintaining the collector front panel in tight sealing contact against the forage box seal surface.

20. The apparatus of claim 2 wherein:

a. the forage box frame further comprises at least one fork joined thereto under the bed and proximate the seal surface; and b. the grain kit collector further comprises means for cooperating with said at least one forage box fork to draw the collector front panel tightly against the forage box seal surface.

21. The apparatus of claim 1 wherein:

a. the grain kit further comprises a pair of holding brackets each fastened to an associated container wall, and each having a stop strip; and b. the rear gate is pivotable between its closed position and an unchangeable partially open position whereat the rear gate abuts the holding brackets side strips.

22. The apparatus of claim 21 wherein:

a. each holding bracket comprises a pin generally parallel to the forage box bed; and b. the collector includes hooks that hook over the holding bracket pins to removeably mount the collector to the holding brackets.

23. A grain kit comprising:

a. a collector having front, back, and side panels, and a floor with an opening therethrough, the collector front panel having a top edge at a first predetermined distance from the floor opening, the collector back and side panels having respective upper edges at a second predetermined distance greater than the first predetermined distance from the floor opening, the front panel having a margin along the upper edge thereof that is substantially parallel to the back panel;

b. means for mounting the collector to a selected container; and c. means for selectively opening and closing the floor opening.

24. The grain kit of claim 23 further comprising a window in at least one collector panel.

25. The grain kit of claim 23 wherein the means for selectively opening and closing the collector floor opening comprises:

a. a hanger suspended from the collector floor;

b. a shaft;

c. means for rotatably supporting the shaft on the hanger and collector;

d. a plate;

e. means for sliding the plate over the floor opening in response to rotating the shaft; and f. means for locking the shaft against rotation.

26. The grain kit of claim 25 wherein the means for locking the shaft comprises:

a. a crank on the shaft, and a lever on the crank;

b. a rod connected to the lever; and c. means for biasing the rod into contact with the hanger and thereby preventing rotation of the shaft.

27. The grain kit of claim 23 further comprising:

a. at least one threaded block joined to the collector back panel; and b. a long shank threaded into the threaded block and passing through the collector back panel.

28. The grain kit of claim 27 wherein the shank has a T-handle on one end and a pad on the other end.

29. The grain kit of claim 28 wherein the threaded shank has a longitudinal axis that makes an angle of between approximately 80 degrees and 85 degrees with the collector back panel.

30. In combination with a forage box having a horizontal bed, upright side walls that cooperate with the bed to define an open rear end, a rear gate pivotable to open and close the rear end, and at least one apron chain having a top run that propels grain along the bed to flow out the rear end when the rear gate is open and a return run under the bed, a grain kit that receives grain flowing from the forage box rear end comprising a collector removeably mounted over a portion of the forage box rear end and comprising a back panel and side panels with respective upper edges higher than the forage box bed, a floor with an opening therethrough, a front panel, and a door that selectively opens and closes the floor opening.

31. The combination of claim 30 wherein the collector front panel seals against a selected seal surface on the forage box.

32. The combination of claim 30 wherein the collector further comprises a window that enables a person to see the quantity of grain received in the collector.

33. The combination of claim 32 wherein the window is in the collector back panel.

34. The combination of claim 30 further comprising means for drawing the collector front panel tightly against a selected seal surface on the forage box.

35. The combination of claim 30 wherein:

a. the forage box has at least one fork under the bed and proximate the selected seal surface; and b. the collector further comprises means for cooperating with said at least one forage box fork to draw the collector front panel tightly against the forage box seal surface.

36. The combination of claim 30 further comprising means for holding the rear gate in a fixed slightly open position whereat a small opening is created between the rear gate and the forage box bed through which grain can flow.

37. The combination of claim 30 wherein the grain kit further comprises a pair of holding brackets fastened to respective side walls of the forage box, each holding bracket comprising a stop strip that overlies the rear gate such that the rear gate abuts the stop strip when the rear gate is in a predetermined slightly open position.

38. The combination of claim 30 wherein the grain kit further comprises:

a. a pair of holding brackets fastened to respective side walls of the forage box, each holding bracket comprising a stop strip that overlies the rear gate such that the rear gate abuts the stop strip when the rear gate is in a slightly open position; and b. means for coacting with the holding brackets to hold the rear gate in a fixed slightly open position.

39. The combination of claim 30 wherein the grain kit further comprises:

a. a pair of holding brackets fastened to respective side walls of the forage box, each holding bracket comprising a stop strip that overlies the rear gate such that the rear gate abuts the stop strip when the rear gate is in a slightly open position; and b. a tab on the rear gate in operative association with each holding bracket, the tabs and holding brackets coacting to hold the rear gate in a fixed slightly open position.

40. The combination of claim 37 wherein:

a. each holding bracket comprises a pin; and b. the collector comprises a pair of hooks that removeably hook over the holding bracket pins to removeably mount the collector to the holding brackets and over a portion of the forage box rear end.

41. The combination of claim 38 wherein:

a. each holding bracket comprises a pin; and b. the collector comprises a pair of hooks that removeably hook over the holding bracket pins to removeably mount the collector to the holding brackets and over a portion of the forage box rear end.

42. The combination of claim 30 wherein the grain kit collector further comprises adjustment means for controlling the amount of pivoting of the forage box rear gate.

43. The combination of claim 30 wherein the collector further comprises:

a. at least one threaded block joined to the back panel; and b. a threaded shank passing through the back panel and threaded into the threaded block and having a first end at a selected distance from the forage box rear gate, so that turning the shank adjusts the first end thereof to be at the selected distance from the rear gate and thereby changes the amount the rear gate can pivot open.

44. The combination of claim 30 wherein the collector door comprises:

a. a first shaft rotatably supported from the collector floor proximate the floor opening;

b. a second shaft supported from the collector floor remote from the floor opening;

c. a universal joint connecting the first and second shafts; and d. means for opening and closing the collector floor opening in response to rotating the second shaft.

45. The combination of claim 30 wherein the collector door comprises:

a. a hanger suspended from the grain kit collector;

b. a shaft rotatably supported on the hanger and on the collector;

c. means for opening and closing the collector floor opening in response to rotating the shaft; and d. a lock for selectively preventing and enabling rotation of the shaft.

46. The combination of claim 45 wherein the lock comprises means on the shaft for selectively contacting and disengaging from the hanger to prevent and enable, respectively, rotation of the shaft.

47. The combination of claim 45 wherein the lock comprises:

a. a crank on the shaft;

b. a rod on the crank;

c. means for biasing the rod into contact with the hanger; and d. a lever on the crank that is operable to disengage the rod from the hanger and thereby enable the shaft to rotate.

48. The combination of claim 30 further comprising means for sweeping grain from the return run of said at least one forage box apron chain.

49. The combination of claim 30 further comprising at least one brush fastened to the forage box in the path of the return run of said at least one apron chain to sweep any grain off the return run.

50. A method of handling grain comprising the steps of:

a. providing a forage box having side walls and a bed that cooperate to define an open rear end, a pivotable rear gate at the rear end, and a chain system having top and return runs;

b. providing a grain kit collector having back, side, and front panels, a floor with an opening therethrough, and a door that opens and closes the floor opening;

c. mounting the grain kit collector over at least a portion of the forage box rear end, and closing the collector floor opening;

d. holding the forage box rear gate in a first position, and filling the forage box with grain;

e. flowing the grain through the forage box rear end into the grain kit collector; and f. opening the grain kit collector floor opening and thereby discharging the grain from the grain collector.

51. The method of claim 50 comprising the further step of sealing the grain kit collector front panel against the forage box.

52. The method of claim 50 wherein:

a. the step of holding the forage box rear gate in a first position comprises the step of initially holding the forage box rear gate in a closed position such that grain cannot flow through the box rear end; and b. the step of flowing the grain through the forage box rear end comprises the step of pivoting the forage box rear gate to a predetermined open position such that grain is able to flow through the forage box rear end.

53. The method of claim 52 wherein the step of pivoting the rear gate comprises the steps of:

a. providing a threaded block on the grain kit collector back panel;

b. threading a shank having a first end proximate the rear gate into the threaded block; and c. turning the shank and adjusting the distance between the shank first end and the rear gate and thereby changing the amount the rear gate can pivot.

54. The method of claim 50 wherein the step of providing a grain kit collector comprises the step of providing an adjustment mechanism that changes the amount the forage box rear gate can pivot.

55. The method of claim 50 comprising the further step of simultaneously operating the forage box chain system to control the flow of grain from the forage box into the grain kit collector.

56. The method of claim 50 wherein:

a. the step of flowing the grain through the forage box rear end comprises the step of operating the forage box chain system to control the flow of the grain from the forage box into the grain kit collector; and b. the step of discharging the grain from the grain kit collector comprises the step of simultaneously operating the collector door such that the discharge of the grain from the collector is substantially equal to the flow of the grain through the forage box rear end into the collector.

57. The method of claim 50 wherein the step of providing a grain kit collector comprises the step of providing a grain kit collector with a window therein and thereby enabling a person to see the quantity of grain in the collector.

58. The method of claim 50 comprising the further step of sweeping any grain on the forage box chain system return run into the grain kit collector.

59. The method of claim 50 wherein the step of holding the forage box rear gate in a first position comprises the step of holding the rear gate in a fixed slightly open position and thereby creating a small opening between the rear gate and the forage box bed through which grain can flow.

60. The method of claim 59 wherein the step of holding the rear gate in a fixed slightly open position comprises the steps of:
   a. fastening a holding bracket having a stop strip to each forage box side wall;
   b. providing tabs on the rear gate; and
   c. abutting the forage box rear gate against the holding brackets stop strips, and simultaneously contacting the holding brackets with the rear gate tabs, so that the rear gate tabs and the holding brackets coact to hold the rear gate in the fixed slightly open position.

61. The method of claim 50 wherein:
   a. the step of providing a grain kit collector comprises the step of providing the grain kit collector with hooks; and
   b. the step of mounting the grain kit collector comprises the steps of:
      i. fastening a pair of holding brackets each with a pin to the forage box side walls; and
      ii. hooking the collector hooks over the holding bracket pins.

62. The method of claim 52 wherein the step of pivoting the forage box rear gate to a predetermined open position comprises the step of pivoting the rear gate to an unchangeable slightly open position.

* * * * *